US 9,805,199 B2

(12) United States Patent
Gschwind (10) Patent No.: US 9,805,199 B2
(45) Date of Patent: *Oct. 31, 2017

(54) SECURELY BOOTING A COMPUTER FROM A USER TRUSTED DEVICE

(71) Applicant: International Business Machines Corporation, Armonk, NY (US)

(72) Inventor: Thomas Gschwind, Rueschlikon (CH)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/645,624

(22) Filed: Mar. 12, 2015

(65) Prior Publication Data

US 2016/0267274 A1    Sep. 15, 2016

(51) Int. Cl.
*H04L 9/00* (2006.01)
*G06F 21/57* (2013.01)
(Continued)

(52) U.S. Cl.
CPC .......... *G06F 21/575* (2013.01); *G06F 9/4406* (2013.01); *G06F 9/4408* (2013.01); *G06F 21/34* (2013.01); *G06F 21/6218* (2013.01); *H04L 63/064* (2013.01); *G06F 2221/032* (2013.01); *G06F 2221/033* (2013.01)

(58) Field of Classification Search
CPC ........ G06F 21/575; G06F 21/57; G06F 9/441; G06F 21/00; G06F 21/34; G06F 21/6218; G06F 9/4406; G06F 9/4401; G06F 9/4408; G06F 9/4416; G06F 11/1417; G06F 2221/033; G06F 2221/032;
(Continued)

(56) References Cited

U.S. PATENT DOCUMENTS

| 5,349,643 A | 9/1994 | Cox et al. |
| 2004/0133790 A1 | 7/2004 | Hensley |

(Continued)

FOREIGN PATENT DOCUMENTS

GB    2527569 A    12/2015

OTHER PUBLICATIONS

List of IBM Patents or Patent Applications Treated as Related.
(Continued)

*Primary Examiner* — Brian Shaw
(74) *Attorney, Agent, or Firm* — Scully, Scott, Murphy & Presser, P.C.; Daniel P. Morris, Esq.

(57) ABSTRACT

A method for allowing a computer to boot from a user trusted device is provided. The computer includes a long-term data storage device storing operating system (OS) services. The user trusted device is connectable to the computer and stores a boot loader detectable and executable by a firmware of the computer, an OS loader designed to load an OS of the computer, and one or more crypto drivers designed for allowing access to the OS and data stored encrypted on the data storage device. The method comprises letting the boot loader be executed to cause to transfer the OS loader from the user trusted device to the computer and executing the transferred OS loader to cause to execute the one or more crypto drivers for the OS and the data stored encrypted on the data storage device to start the OS services and complete booting of the computer.

13 Claims, 6 Drawing Sheets

(51) Int. Cl.
*G06F 9/44* (2006.01)
*G06F 21/34* (2013.01)
*G06F 21/62* (2013.01)
*H04L 29/06* (2006.01)

(58) Field of Classification Search
CPC .... G06F 2221/2153; G06F 8/61; G06F 8/665; H04L 9/088; H04L 63/064; H04W 12/10
USPC .............................. 380/45; 713/2; 726/27, 34
See application file for complete search history.

(56) References Cited

U.S. PATENT DOCUMENTS

| | | | |
|---|---|---|---|
| 2007/0280510 A1* | 12/2007 | Owen | G06F 21/32 |
| | | | 382/115 |
| 2008/0091934 A1* | 4/2008 | Peterson | G06F 21/6281 |
| | | | 713/2 |
| 2012/0011354 A1 | 1/2012 | Owen | |
| 2014/0115652 A1* | 4/2014 | Kapoor | G06F 21/554 |
| | | | 726/1 |

OTHER PUBLICATIONS

International Search Report dated May 11, 2016, issued in PCT/EP2016/055096.
Gotzfried, J., et al., "Mutual Authentication and Trust Bootstrapping towards Secure Disk Encryption", ACM Transactions on Information and System Security, Nov. 2014, 23 pages, vol. 17, No. 2, Article 6.
Office Action dated Feb. 10, 2017 received in U.S. Appl. No. 14/824,771, 23 pages.

* cited by examiner

SECURELY BOOTING A COMPUTER FROM A USER TRUSTED DEVICE

FIELD OF THE INVENTION

The invention relates in general to the field of methods for securely booting computers, and in particular to methods for booting a computer from a user trusted device, such as a light, protected memory device.

BACKGROUND OF THE INVENTION

Today, more and more computer users encrypt their hard disks (or more generally their long-term data storage device) to ensure that, in case of loss of the hard disk, the "finder" does not gain access to the user's data. Full disk encryption works fine to prevent such a finder to access the data. However, the usual disk encryption solutions do not prevent somebody who has access to the computer to spy out the legitimate user's password.

Systems that use encrypted disks need to be able to boot the computer from the hard disk, which is accomplished by using an OS loader that is unencrypted, where the OS loader typically includes a boot loader. The BIOS (or the initializing firmware) would otherwise not be able to decrypt it and hence start it. The boot loader or OS loader then prompts the user for a passphrase that is used to unlock the encryption key. With this key, the encrypted contents of the hard disk can be decrypted and the operating system can subsequently be started.

A problem that arises is that an attacker can manipulate the OS loader (stored in clear text) for it to store a copy of the passphrase (e.g., somewhere on the computer in clear text or send it to a server via the computer's network interface if available) the next time the user starts her/his computer. Once the computer has been started with the compromised OS loader, the attacker can read out the passphrase from his location and gain access to the computer.

BRIEF SUMMARY OF THE INVENTION

According to a first aspect, the present invention is embodied as a method for allowing a computer to boot from a user trusted device, wherein:

the computer comprises a long-term data storage device storing operating system services, or OS services; and the user trusted device is connectable to the computer and stores:

a boot loader, detectable and executable by a firmware of the computer, upon connection of the user trusted device to said computer;

an OS loader for an operating system, or OS, of the computer; and one or more crypto drivers for said OS, designed for allowing access to the OS and data, stored encrypted on said data storage device;

wherein the user trusted device is designed to prevent unauthenticated access of each of: the boot loader; the one or more crypto drivers; and the OS loader, as stored thereon, the method comprising:

upon connection of the user trusted device to the computer, letting the boot loader be detected by said firmware for a subsequent execution of the boot loader at least partly at the computer to cause to transfer the OS loader from the user trusted device to the computer, by loading the OS loader into a main memory of the computer, without storing any part of the loaded OS loader on the long-term data storage device of the computer; and executing the transferred OS loader at least partly at said computer, to cause to execute the one or more crypto drivers for said OS and a kernel of said OS, to start said OS services and complete booting of the computer.

In embodiments, the method may include one or more of the following features:

Said boot loader and/or said OS loader are designed to cause, upon subsequent execution at least partly at said computer, to reconfigure boot configuration parameters of the transferred OS loader, such as a Boot Configuration Data store, to allow the OS services to be started from the long-term data storage device.

The method further comprises: retrieving an encryption and/or a decryption key from the user trusted device, and providing the retrieved key to the one or more crypto drivers during their execution.

The method further comprises: prior to said connection of the user trusted device to the computer: analyzing said long-term data storage device to detect one or more of the following entities: a boot loader; an OS loader; and one or more crypto drivers, each residing unencrypted on the long-term data storage device of the computer; and after authentication to the user trusted device, storing versions of the detected entities on the user trusted device, respectively as said boot loader and/or said OS loader and/or said one or more crypto drivers, wherein the stored versions of the boot loader and/or the OS loader are reconfigured to cause, upon the subsequent execution of the boot loader and/or the OS loader, to reconfigure boot configuration parameters of the OS loader, to allows the OS services to be started from the long-term data storage device of the computer, and wherein, preferably, the method further comprises removing or disabling the boot loader and/or OS loader detected on the data storage device.

The long-term data storage device analyzed is unencrypted, the method further comprising, prior to said connection of the user trusted device to the computer, storing one or more crypto drivers for said OS on the user trusted device, in addition to or as part of storing a reconfigured version of the detected OS loader, and this, preferably by adding said one or more crypto drivers to the detected OS loader, such that the version of the OS loader stored on the user trusted device includes said one or more crypto drivers.

The method further comprises: prior to said connection of the user trusted device to the computer: generating at least one key for encrypting and decrypting the long-term data storage device, and storing the generated at least one key on the user trusted device, configuring the one or more crypto drivers and the OS loader for them to cause to retrieve said at least one generated key from the user trusted device, prior to or during execution of the one or more crypto drivers caused by said subsequent execution of the transferred OS loader; and encrypting the data storage device with one of the at least one generated key.

The long-term data storage device that is analyzed is encrypted, and the method further comprises: prior to said connection of the user trusted device to the computer: retrieving, from the computer, at least one key for encrypting and decrypting the data storage device; and storing the retrieved at least one key on the user trusted device or an entity accessible by the user trusted device, such as smart card, and removing the retrieved at least one key from the computer, and wherein storing versions of said detected entities comprises storing versions of the one or more crypto drivers and the OS loader, which versions have been reconfigured to cause to retrieve said key from the user trusted device, prior to or during execution of the one or more crypto drivers caused by said subsequent execution of the transferred OS loader.

The method further comprises: prior to said connection of the user trusted device to the computer and while installing the OS on the computer: configuring the one or more crypto drivers and/or the OS loader, such that the configured one or more crypto drivers and the OS loader can be stored on the user trusted device and, preferably, are able to cause to retrieve said key from the user trusted device, upon said subsequent execution of the OS loader transferred to the computer.

The method further comprises: after completing the booting of the computer: authenticating to the user trusted device to allow a reconfigured version of the boot loader and/or the OS loader to be stored on the user trusted device.

The method further comprises: replacing the detected boot loader and/or the detected OS loader on the long-term data storage device with a honeypot boot loader and/or a honeypot OS loader; and storing a copy of each of said honeypot boot loader and said honeypot OS loader on the user trusted device.

The boot loader is further designed such that, upon connection of the user trusted device to the computer, the boot loader is detected by said firmware and subsequently execute at least partly at the computer to further cause to: compare the honeypot boot loader and/or the honeypot OS loader as stored on the computer in replacement of the detected boot loader and/or the detected OS loader, respectively with the honeypot boot loader and/or the honeypot OS loader, respectively, as stored on the user trusted device; and if the compared versions do not differ, execute the transferred OS loader at least partly from said computer.

The method further comprises: if the compared versions differ, notifying that the compared versions differ.

According to another aspect, the invention is embodied as a user trusted device designed for allowing a computer to boot from said device, wherein the user trusted device is connectable to the computer and comprises: a boot loader, detectable and executable by a firmware of the computer upon connection of the user trusted device to said computer; an operating system loader, or OS loader, for an operating system, or OS, of the computer, and wherein: the user trusted device is furthermore designed to prevent any unauthenticated user to modify any of the boot loader and the OS loader stored thereon; and the boot loader and the OS loader are otherwise configured such as to allow for implementing all the steps of methods according to embodiments.

According to still another aspect, the invention is embodied as a computerized system, comprising the user trusted device of claim 10 and the computer, to which the user trusted device is connectable.

According to a final another aspect, the invention is embodied as a computer program product for allowing a computer to boot from a user trusted device, the computer program product comprising a computer-readable storage medium having computer-readable program code embodied therewith, preferably consisting of several modules, the computer-readable program code configured to implement all the steps of the method according to present embodiments.

Devices, systems and methods embodying the present invention will now be described, by way of non-limiting examples, and in reference to the accompanying drawings.

DETAILED DESCRIPTION OF THE INVENTION

Figure 1:
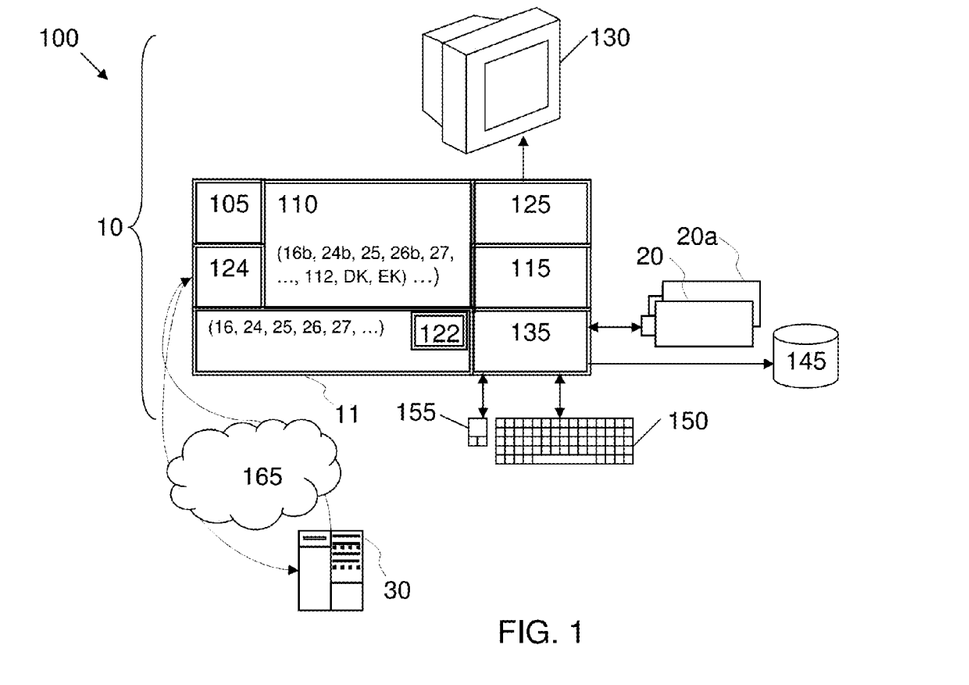
FIG. 1 schematically represents a computerized system, suited for implementing one or more method steps as involved in embodiments of the invention.
Figure 2:
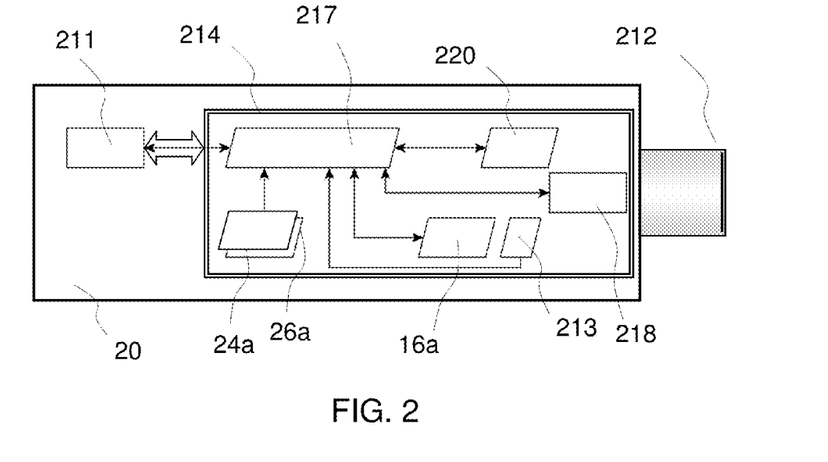
FIG. 2 schematically illustrates selected components of a user trusted device, as involved in embodiments, and configured for implementing method steps as in embodiments of the invention.
Figure 3:
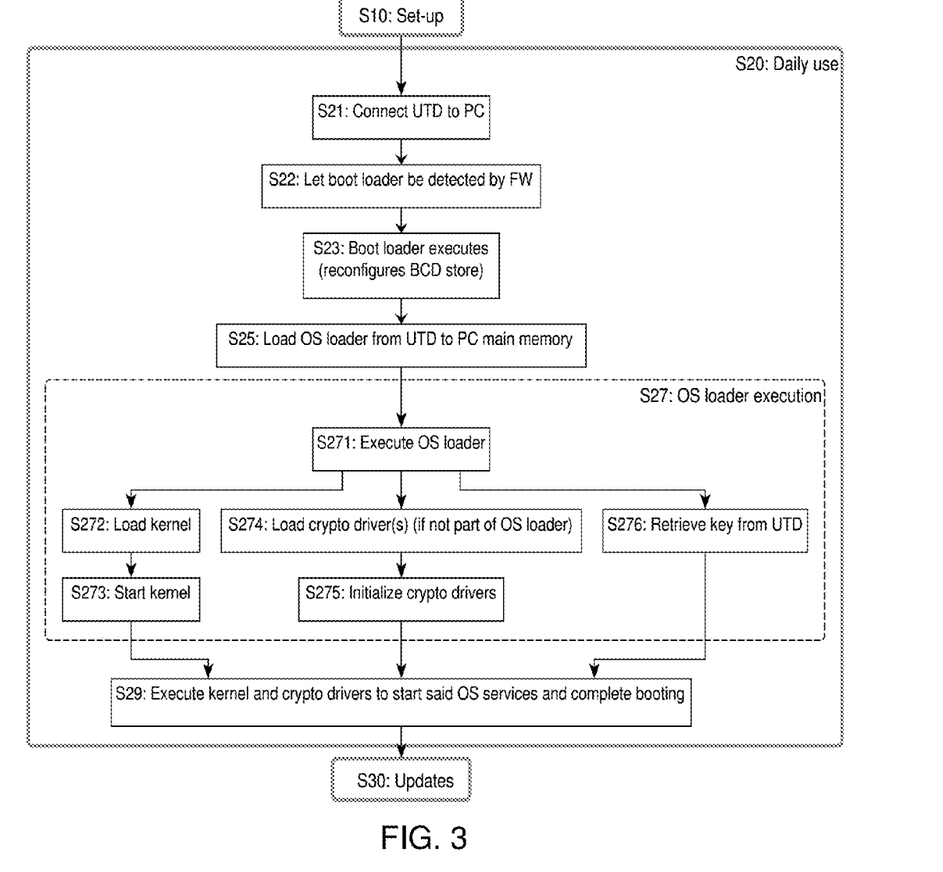
FIGS. 3-8 depict flowcharts illustrating high-level steps of methods according to embodiments of the invention.

In reference to FIGS. 1-3, an aspect of the invention is first described, which concerns a method for allowing a computer 10 to securely boot from a user trusted device 20 (hereafter UTD, for short).

The technical context assumed is the following: the computer 10 notably comprises a long-term data storage device 11, which typically is a hard-disk drive (or HDD), a solid-state memory, or any other suitable mass storage device. For the sake of illustration, the long-term data storage device is in the following assumed to be a HDD, without loss of generality. The HDD stores operating system services 25, or OS services. The UTD 20 is connectable to the computer 10 and notably stores: a boot loader 16a and an operating system loader (hereafter OS loader) 24a, as well as one or more crypto drivers 26a. The boot loader 16a is configured such as to be detectable and executable by a firmware 122 (e.g., the BIOS) of the computer, upon connecting the UTD 20 to the computer 10. The OS loader 24a is designed to load the OS 112 of the computer, whereas the crypto drivers 26a are designed to allow access to this OS as well as other data (e.g., user data like documents, files, or applications), stored encrypted on the HDD 11.

The UTD above is a "user trusted" device in that sense that it is designed to prevent unauthenticated access to (of each) the boot loader, the crypto drivers and the OS loader that are stored thereon. As to be discussed later in detail, other functions may be provided to secure it further.

Basically, the present methods revolve around the following two essential steps:

First, upon connection S21 of the UTD to the computer, the boot loader 16a is detected S22 by the firmware 122, which causes a subsequent execution S23 of the boot loader. This execution shall take place at least partly at the computer. I.e., the execution of the boot loader may take place at the computer only, or concurrently at the UTD and the computer. To that aim, contents 16b of the boot loader can be transferred to the main memory of the computer. The execution of the boot loader causes to transfer S25 the OS loader 24a from the UTD to the computer, by loading S25 the OS loader into a main memory 110 of the computer. However, the transfer does not store any part of the loaded OS loader on the HDD 11.

Second, the transferred OS loader 24b is executed S27 at least partly at the computer 10, which in turn causes to execute S29 the crypto drivers 26b and a kernel 27 of the OS, in order to start the OS services 25 and complete booting.

In embodiments, and beyond the OS services, the HDD of the computer may further store other OS components, e.g., one or more of the OS kernel 27; OS libraries; other crypto drivers; an initial version 24 of the OS loader; or still application programs of the OS 112. Some of these components may also be stored elsewhere; they do not necessarily need to be stored on the HDD. Still, they should be available to the computer in time for booting, and as necessary for the computer to boot. Thus, the OS kernel, libraries and crypto drivers may initially be stored anywhere, provided that they are transferred to the computer in time for booting (such components are loaded into the main memory, as per a normal boot process).

The concept of OS services, OS kernel, libraries and crypto drivers are well known. OS services are services provided by an OS, which may be used by application programs. This includes system libraries, daemons on Unix systems or system services on Windows systems. Crypto drivers can be regarded as decryption/encryption modules designed to allow encrypted data stored on the HDD to be accessed by the OS.

Concerning now the OS loader vs. boot loader: usually, when a computer is switched on or restarted, some firmware component (usually the basic input/output system or BIOS) performs some initial tests and, then, transfers control to the master boot record or MBR where the boot loader usually resides. Amongst other things, the MBR contains executable code to function as a loader for an installed operating system. This MBR code is usually referred to as a boot loader. For UEFI firmware, the BL is usually stored in the EFI system partition as a file which is executed by the UEFI firmware. Consistently, in the context of the invention, the boot loader is some executable code that performs some actions required to load the OS into memory.

Now, the OS loader is also usually referred to as some executable code involved to load the OS into memory. In this respect, it should be noted that the software literature does not always clearly make the distinction between the two concepts. For example, in the Windows documentation, the boot loader is sometimes implicitly assumed to be part of the OS loader. However, in the present context, the boot loader is involved upstream of the OS loader, during an initial phase of the boot process, to transfer the OS loader into the computer's main memory. I.e., it is a piece of code, which, upon execution, shall cause to transfer the OS loader for subsequent execution thereof.

The OS loader can be regarded as a pre-boot environment (but not to be confused with the so-called PXE pre-boot environment). I.e., the OS loader is some code, which is able, upon execution, to load the drivers, kernel, and, if necessary, contribute to initialize the hardware, e.g., for Windows OSs. Still, each of the boot loader and the OS loader is some executable code, e.g., in binary form, each involved in the bootstrap process.

For instance on Windows OSs, the OS loader is designed to load all the drivers of type SERVICE_BOOT_START before the loader transfers control to the kernel. By indicating that a crypto driver stored on the UTD is of this type, the kernel can use this driver to access, in turn, the encrypted HDD of the computer. Furthermore, on Windows, the system partition contains the OS loader, which, in the present context, may be stored as such on the UTD as later discussed in respect of the set-up phase.

As another example, on Linux operating systems, the so-called Grub boot loader (a set of files) loads the Linux kernel and the so-called initrd file system, i.e., a temporary root file system into the main memory, from where the Linux kernel may subsequently load the crypto driver(s). Here the initrd file system can be regarded as part of the OS loader. In the present context, the initrd file system may, in embodiments, be first located on the UTD and then transferred to the computer. Note that, also in this context, the initrd file system contains some executable code transferred thanks to the (grub) boot loader.

Note that the OS services that are stored on the computer are preferably not stored on the UTD. In this respect, it should be emphasized that present methods all involve an external OS loader that is executed to start OS services as stored on the computer and not on an external device. Therefore, the present methods distinctly differ from solutions that consist of booting a computer from an external device such as a USB device that contains a full OS or most substantial components thereof. Similarly, OS libraries are preferably not stored on the UTD and are rather stored on the computer. However, and despite the many variants contemplated herein, the boot loader and OS loader shall preferably not be stored on the computer (at least not at the beginning of the bootstrap process). This is to prevent that somebody can modify the boot loader or the OS loader and that the user accidentally boots the computer without UTD, which may cause the encryption key to be revealed to a malicious user.

As explained later in detail (in reference to the set-up phase), the version of the OS loader 24a that resides on the UTD is typically derived from a version 24 of the OS loader that, typically, is initially stored on the computer. In this regard, a distinction should be made between: the version 24 as initially stored on the computer, the version 24a as stored on the UTD, and the version 24b (or components) of the boot loader as later transferred to the PC. A similar reference scheme is adopted for versions of the boot loader 16, 16a, 16b and versions of the crypto drivers 26, 26a, 26b. Note, however, that, in the present context, the boot loader 16a as stored on the UTD is typically not identical to the initial version 16. Rather, it shall likely need to be modified to allow the computer to boot from its own HDD, and this, in spite of the fact that the boot loader version 16a is stored on the UTD (which normally leads to automatic parameter changes that would otherwise prompt the computer to boot from the UTD, as discussed in more details below). The version of the boot loader as stored on the UTD is, furthermore, possibly modified to include an encryption and decryption driver. For example, when using Windows, this can be accomplished by updating the Boot Configuration Data (BCD) store. The BCD store is stored together with other components of the OS loader on the Windows System Partition. When using Linux systems, this can be accomplished by setting the root device used by the OS and updating the boot configuration in the grub.conf file and/or, possibly, the initrd initial file system, depending on the Linux distribution.

Embodiments of the above method are illustrated in FIGS. 3-8; they allow to securely boot a computer, even in situations where an attacker or malware tampers with the computer's HDD 11, it being noted that the boot loader and the OS loader otherwise typically resides unencrypted and modifiable on the HDD to be able to start the boot process.

Note that the OS loader 24b (i.e., the version as transferred into the main memory 110) cannot be executed concurrently with any initial version 24 thereof, as stored on the HDD of the computer. Thus, the present scheme, which relies on external boot loader and OS loader, makes sure that a genuine OS loader is transferred into the main memory (only), for execution, which minimizes the risk of tampering with it.

Still, the loaded OS loader 24b may be designed to interact with additional or complementary modules of the UTD, which modules may execute partly or fully at the UTD, if the latter has processing capability, if any.

In embodiments, one or each of the boot loader and the OS loader are designed to cause, upon subsequent execution S23, S27 at the computer, to reconfigure boot configuration parameters (e.g., the BCD store) of the transferred OS loader, to allow the OS services to be started from the HDD 11. This function is, however, better implemented in the boot loader, because a simple reconfiguration of the OS loader's boot parameters (by the boot loader) may suffice to achieve this.

An OS, e.g., Windows, may likely impose that the BCD and the OS services be stored on the same storage device. In such a case, a solution is needed for the OS services to be able to start from the HDD, even though the OS loader is transferred from the UTD. As it can be realized, this can be achieved by reconfiguring boot parameters, such as stored on the BCD store.

In variants, one may implement a device driver that emulates to the OS loader and the subsequent OS services as a single storage device. This device driver may be configured to redirect accesses to the boot loader and OS loader to blocks on the UTD and redirect accesses to the OS partition to the HDD. However, such variants are more complicated to implement and should preferably be used only if the boot loader and/or the OS loader do not support the former option.

So far, and although the above embodiments evoke crypto drivers stored on the UTD, nothing was said about the encryption/decryption key, which would likely be involved to further secure the process. Usually, one uses a single encryption/decryption key. However, several keys could be used, e.g., one for decryption, one for encryption. One may also, strictly speaking, only need one key for decryption if no subsequent encryption is sought (unlikely). For simplicity yet, a single encryption/decryption key can be assumed. This key is preferably stored on the UTD. In this respect, and as illustrated in FIG. 3, embodiments of the present invention may further include steps of: retrieving S276 an encryption key EK and/or a decryption key DK from the UTD; and providing the retrieved key to the crypto drivers during their execution S29. In other words, the OS loader or the crypto drivers may proceed, when executing, to retrieve the encryption/decryption key. In particular, the crypto drivers may take care of retrieving the needed key and access the retrieved key, when needed, at a later stage of their execution. Preferably, retrieving the key requires a passphrase from the user in order to unlock the key as stored on the device. In variants, the boot loader may be designed to take care of this, provided the OS permits it. However, the OS may not allow this, whence the interest of being able to do this via the crypto drivers.

As said, this key is preferably stored on the UTD. In variants, the key could be located on another external storage medium distinct from the present UTD. It could also be supplied via the computer's keyboard, by the user, upon request. Now, since embodiments of the present invention requires a UTD, it is most practical to allow users to boot the computer thanks to the sole UTD. Still, the UTD itself may proceed to retrieve the key from an external or a complementary medium, such as a smart card.

Preferably, an additional passphrase is required, in case both the computer and the UTD are lost or stolen. This passphrase is preferably entered via the computer but it may also be entered on the UTD itself, if the latter possesses the necessary user interfaces. The latter scenario is notably preferred when the same UTD is used to unlock multiple different computers.

To support unlocking of multiple different computers, the boot loader stored on the UTD may maintain a list of profiles, one for each computer which is indexed by one or more unique identifiers of the computer such as the computer's CPUID, or Hardware MAC address of one of its network interface cards.

At present, more shall be said about the set-up phase S10, in reference to FIGS. 4, 6-8.

Figure 4:
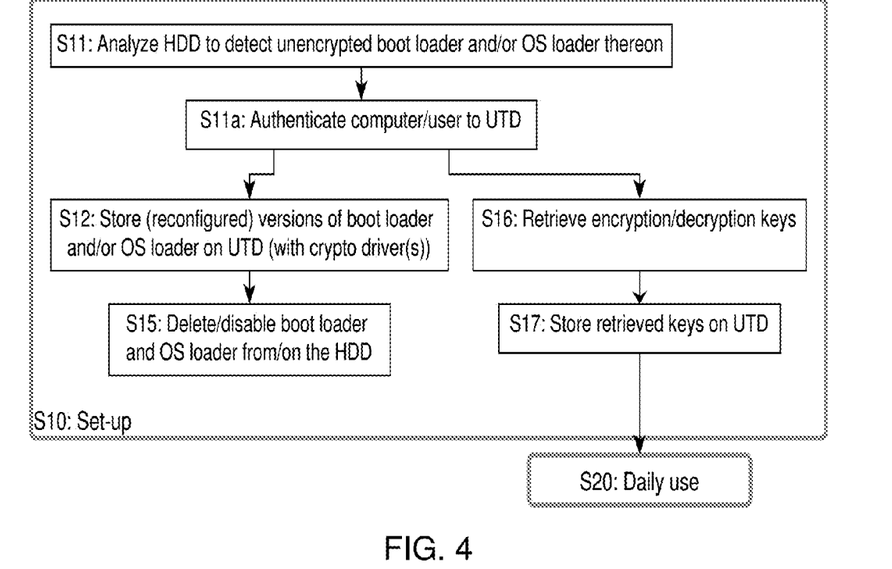
Figure 6:
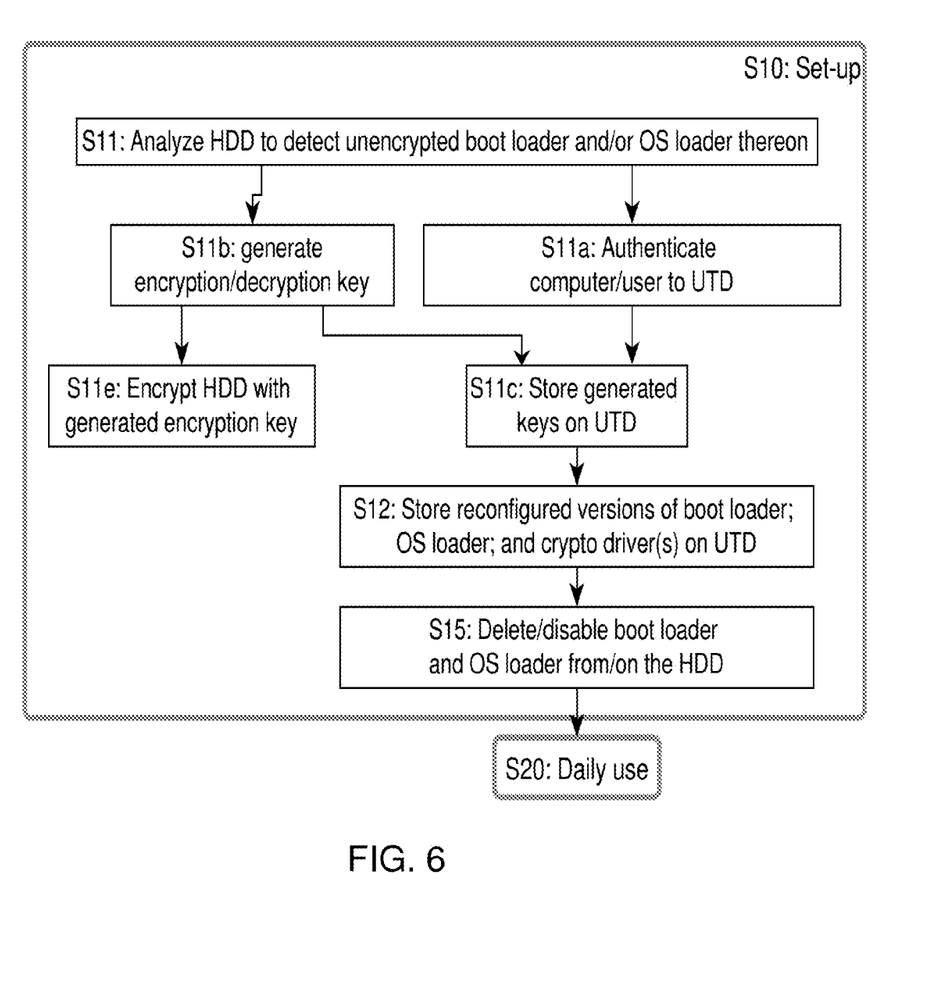
Figure 8:
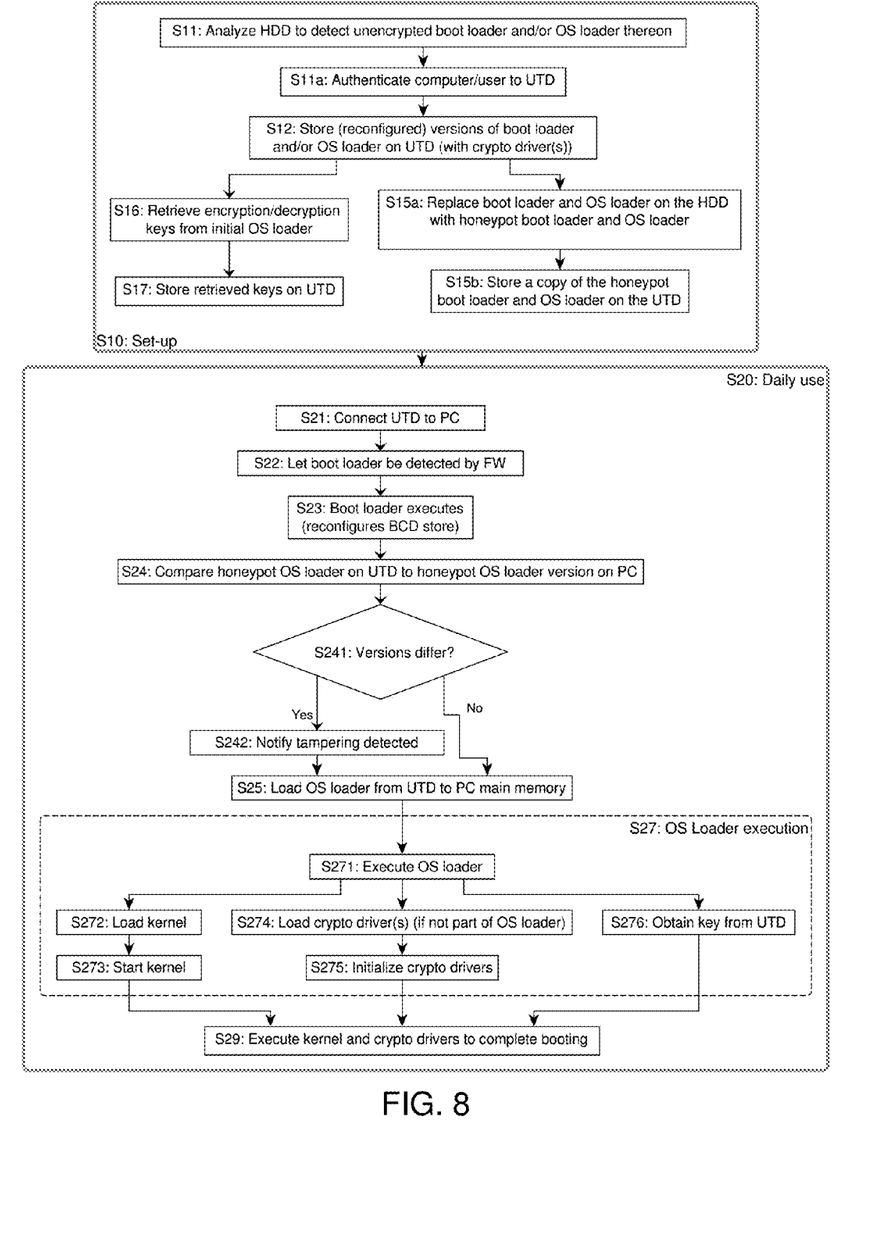

First, referring to FIGS. 4, 6 and 8, embodiments of the present method may further comprise, during the set-up S10 (i.e., prior to connecting S21 the UTD to the computer to boot the latter), steps S11 and S12, wherein:

Step S11 comprises analyzing the HDD to detect one or more of the following entities: a boot loader 16; an OS loader 24; and one or more crypto drivers, each residing unencrypted on the HDD 11 of the computer; and Step S12 comprises storing (after authentication S11a to the UTD) versions of the one or more detected entities on the UTD, respectively as said boot loader 16a and/or said OS loader 24a and/or said one or more crypto drivers 26a. As discussed earlier, the stored versions of the boot loader and/or the OS loader are suitably reconfigured to cause, upon the subsequent execution S23, S27 of the boot loader and/or the OS loader, to reconfigure boot configuration parameters of the OS loader, to allow the OS services to be started from the HDD of the computer.

Having done so, one may preferably remove or disable S15 the boot loader and/or OS loader detected on the HDD 11.

As it can be realized, it is easier to program the boot loader to reconfigure the OS loader's boot parameters than to change the OS loader. Of course, if the OS loader is already reconfigured during the set-up phase, there is no need for the boot loader to reconfigure the OS loader, e.g., by way of reconfiguring the BCD store when subsequently executing at the computer S23. Still, the boot loader could be designed ab initio to cause to reconfigure the boot parameters during step S23. Now, one notes that it is nevertheless more advantageous to modify the boot parameter at the beginning of the boot process, because if the long-term storage device layout changes between the set-up and the booting, then the most recent changes can be detected by the boot loader and/or the OS loader, which will allow to more relevantly update the boot parameters.

Be it during the set-up or the beginning of the boot process, a reconfiguration will be needed, in most likely embodiments. Without this reconfiguration, the boot loader and/or OS loaders may "naturally" look for OS services stored on the UTD (for Windows implementations), since they have been stored on the UTD. More generally, this reconfiguration is performed to prevent the boot loader and/or OS loader to try to load the OS from the UTD (Windows) or that device drivers needed to access the UTD are loaded as part of the OS loader (Linux).

The reconfiguration may for instance cause: (i) to analyze: a root device of the OS loader; and the crypto drivers, and, if necessary (ii) to boot from the UTD to modify the boot loader and/or the OS loader. The underlying idea is to perform the changes on the UTD itself if one does not want to or cannot change the set-up of the system (i.e., cryptroot). Since the UTD may comprise a processor, this could even be preferred, to minimize the changes to the OS services.

The reconfigured versions can be reconfigured either by the computer before being stored on the UTD or by the UTD itself.

Steps S11 and S12 (set-up phase) are performed as early as possible, if needed, to install the OS loader on the UTD, i.e., before any malicious user had a chance to tamper with the OS loader, which resides unencrypted on the HDD of the computer.

Note that the computer is required to authenticate itself to the UTD to be allowed to copy a version of the OS loader thereon. Authentication will likely occurs in one of the following ways:
   (i) Some code is sent from the computer to the UTD, which is supplied by the user via the computer's keyboard;
   (ii) The user authenticates directly to the UTD;
   (iii) Initially, when shipping the UTD, the device accepts any OS loader. But as soon as a first OS loader has been stored, any subsequent modification requires authentication;
   (iv) After the user did authenticate to the UTD from the computer once, store some token on the computer with which the authentication can be performed automatically. Preferably, this token is stored in the encrypted portion of the HDD.

After copying the boot loader/OS loader to the UTD, these are preferably removed from the HDD or disabled to prevent that the user boots, by accident, the computer from the boot loader and the OS loader still stored on the HDD, because a malicious user may otherwise still be able to tamper with the boot loader/OS loader stored on the HDD.

In variants, the boot loader may be replaced with a modified version, urging the user to boot the computer only in combination with a UTD. Thus, the computer does not appear to be deprived of any OS installed thereon, to prevent accidental OS installation and data deletion.

In order to configure the UTD to boot the currently installed OS, we need to identify how the currently booted system has been configured. I.e., again, some boot parameters need be modified. On Windows systems, this information is stored in the BCD store i.e., by updating the Device entry in the Windows Boot Loader section. On Linux systems, this information is stored in the configuration file of GRUB in/boot/grub/grub.conf as part of the kernel boot parameters. This configuration file lists the kernel to use, the initrd file to use, containing all the startup configuration scripts, the device drivers, and the kernel boot parameters to use. All these files contribute to loading the operating system. Potentially, changes to the initrd file may also be necessary, depending on the Linux distribution. On Linux, GRUB, the initrd, and to a certain degree the kernel make up the Linux OS loader.

Note that the following options may be assumed:
   1. The computer's HDD is not yet encrypted with any full disc encryption solution. Thus, one needs to encrypt it and configure the UTD. This situation is discussed below in section 1 and reflected in FIG. 4.
   2. The computer's HDD has already been encrypted with a full disc encryption driver, as discussed below in section 2;
   3. The UTD device is configured during the installation of the OS and the HDD is encrypted at the same time, section 3.

1. Computer's HDD is not Yet Encrypted

Here, the assumption is that the computer's HDD is not yet encrypted with any full disc encryption solution, such that one needs to encrypt it and configure the UTD. Encryption of the data storage can be achieved using any suitable known type of encryption. After encryption, the whole content of the HDD is encrypted except for the boot loader and OS loader. The HDD could also be left unencrypted (in an unlikely scenario). However, keeping the HDD unencrypted would be of limited use inasmuch as an attacker could get hold of the entire disk contents and may therefore not even have to tamper with the boot loader or the OS loader.

If the HDD to be analyzed S11 is unencrypted, one may, during the set-up phase S10, store S12 crypto drivers on the UTD, in addition to (or as part of) storing the reconfigured version(s) of the detected OS loader, as illustrated in FIG. 4 or 6. This can be achieved by adding the crypto drivers to the detected OS loader, such that the version of the OS loader stored on the UTD includes the crypto drivers.

The idea here is that no full disc encryption solution has been installed yet on the computer therefore no crypto driver exists or if it does exist already, it is not enabled. In this case, we can add and/or enable the crypto drivers. And as described in the following, we can encrypt the hard disk, such as to provide a full disc encryption solution. However, no crypto driver is typically present in the OS Loader. Thus, no crypto driver is loaded while the OS is booted and the OS cannot make use of any driver. It is therefore convenient to store crypto drivers on the UTD. Eventually, when the OS is loaded, the drivers will be used by the OS, as necessary to complete booting (such drivers will allow the OS loader to later decrypt and use the HDD). The crypto drivers could else be available from another source, e.g., another UTD or a server, but this would be less practical.

However, when using Windows bitlocker, support is already included in the OS loader itself. Thus, no extra crypto driver is necessary if the UTD is to be used in combination with BitLocker (the latter being already part of the OS loader).

Referring to FIG. 6, the encryption/decryption key may further be generated during the set-up phase (step S11$b$). The generated key may then be stored S11$c$ on the UTD. Consistently, one may configure S11$d$ the crypto drivers and the OS loader for them to cause, later on, to retrieve S276 the generated key from the UTD (prior to or during execution S29 of the crypto drivers, itself caused by execution S27 of the transferred OS loader 24$b$). Finally, encryption S11$e$ of the HDD can be performed with the generated key.

The encryption is preferably performed right after generation of the keys, i.e., before or in parallel to storing the generated keys on the trusted device. This is of interest if the HDD was not yet encrypted, when willing to use full disc encryption and the UTD. The scheme of FIG. 6 makes it possible to encrypt the hard disk and, in parallel, initialize the UTD. Hence we do not have to first perform a full disc encryption and then perform the UTD set-up. However, such a solution may require to know internals of the OS loader and the full disc encryption technology that shall be used.

On Windows, there are multiple potential implementation choices. Either the disk encryption and decryption device driver knows about the UTD and directly retrieves the keys from there (optionally requesting a passphrase from the user, see above). Alternatively, depending on how the keys are stored on the UTD, the Windows Boot manager "bootmgr" that is aware of a Bitlocker encryption can be modified to retrieve the keys from the UTD or replaced with a compatible one that additionally retrieves the keys from the UTD.

On Linux Ubuntu 14.04, in order to ensure that the passphrase and keys can be obtained from the UTD, the cryptroot subsystem needs to be updated.

2. The Computer's HDD has Already been Encrypted

Referring back to FIG. 4, we now assume that the HDD to be analyzed S11 is already encrypted, e.g., the computer's HDD has already been encrypted with a full disc encryption driver. In that case, embodiments of the present methods may further comprise (at set-up, i.e., prior to connection S21) steps of: retrieving S16 the key from the computer; and storing S17 the retrieved key on the UTD or an entity accessible by the UTD, such as smart card. Then, the key may be removed from the computer. The versions of the crypto drivers and the OS loader stored at step S12 may, in that case, be reconfigured such as to (later) cause to retrieve the key from the UTD, i.e., prior to or during the execution step S29.

Depending on the full disk encryption solution and its configuration, the key may for instance be retrieved from the computer, e.g., from a version of the OS loader as initially managed by the computer, or from an external storage device (distinct from the present UTD).

The above scheme allows to secure the retrieved key. This also means that one may have to update the OS loader for it to know where such a key is and how to access the relocated key. In case PGP desktop is used, the OS loader needs to be updated. If BitLocker is used, the boot loader only has to be updated if the encryption/decryption key has to be protected with a passphrase.

Finally, we note that, during the set-up, the UTD does typically not yet comprise any of the OS kernel, the crypto drivers and application programs for said OS. Still, in variants, some of these components could be included as part of a set-up program stored on the device. Thus, if the UTD is used (like a memory stick), such a set-up program could be used to install/upgrade the full disk encryption solution used on the computer.

3. UTD Configured During OS Installation with DSD Encrypted at the Same Time

The context assumed now is that the UTD device is configured during the installation of the operating system and the HDD is encrypted at the same time (it is assumed that the HDD is "empty"). In such a case, and referring to FIG. 7, embodiments of the present methods may further comprise, during the set-up phase S10 and while installing the OS on the computer, a step of configuring the crypto drivers and/or the OS loader, such that the reconfigured versions can be stored S12 on the UTD. Here again, the reconfigured components should preferably allow to retrieve S276 the key from the UTD, upon execution S27 of the OS loader (once transferred to the computer).

Figure 7:
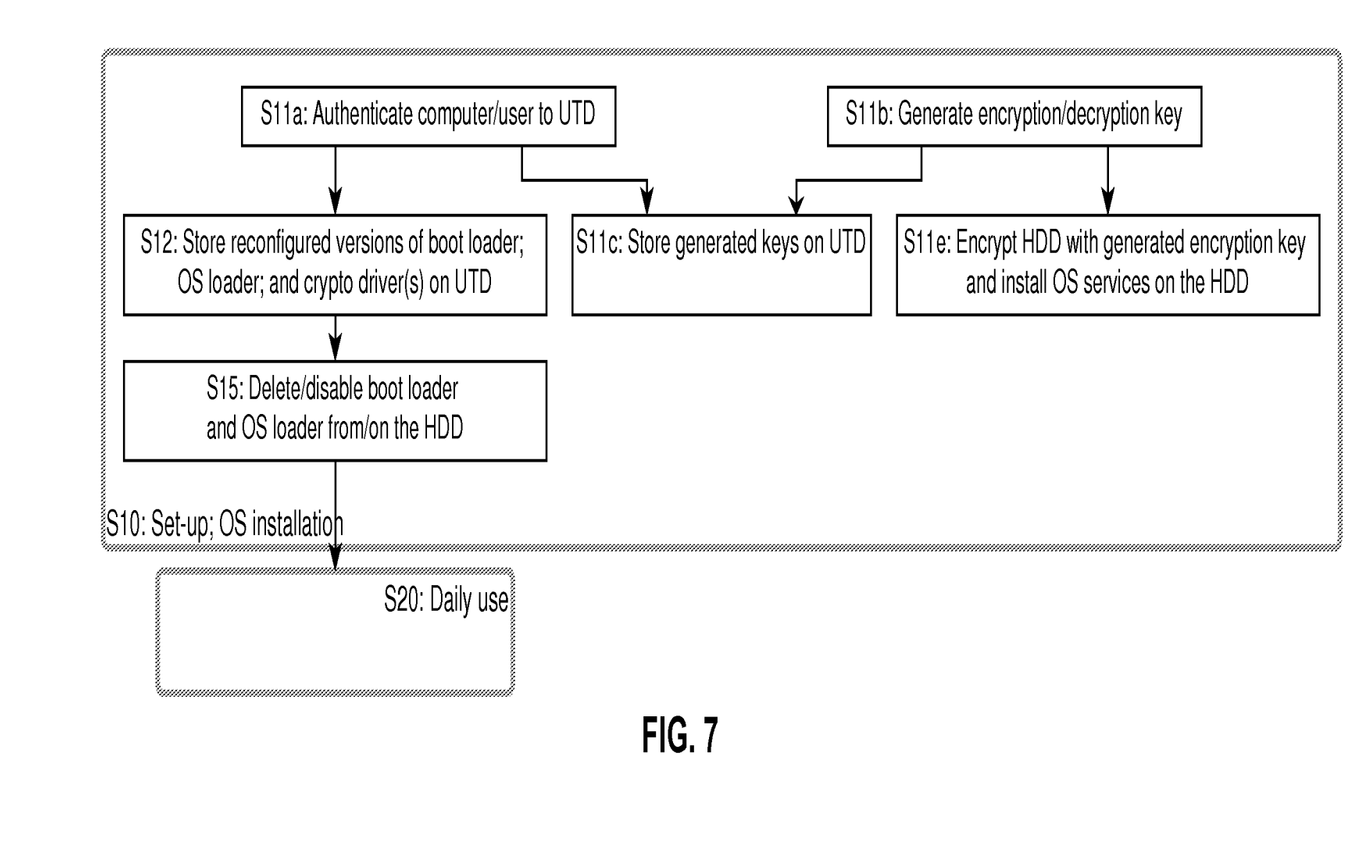

The idea is that we may want to be able to specify that we want to use the computer with a UTD when we install the OS for the very first time. In fine, the UTD is nevertheless configured in much the same way as it is in the contexts discussed in the previous sections. However, here a preferred option is that, during OS installation, instead of writing a boot loader and OS loader to the HDD (as typically during OS installation,), the boot loader, OS loader and crypto-drivers are directly stored on the UTD, appropriately configured to boot from the HDD.

Finally, and for each of the three options contemplated above, once the OS loader/cryptodrivers are stored on the UTD, one can disable direct boot from the HDD, step S15, by placing, into the HDD's MBR or the like, a further boot loader (not to be confused with the boot loaders 16, 16*a*, 16*b*) prompting the user to use the UTD.

Figure 5:
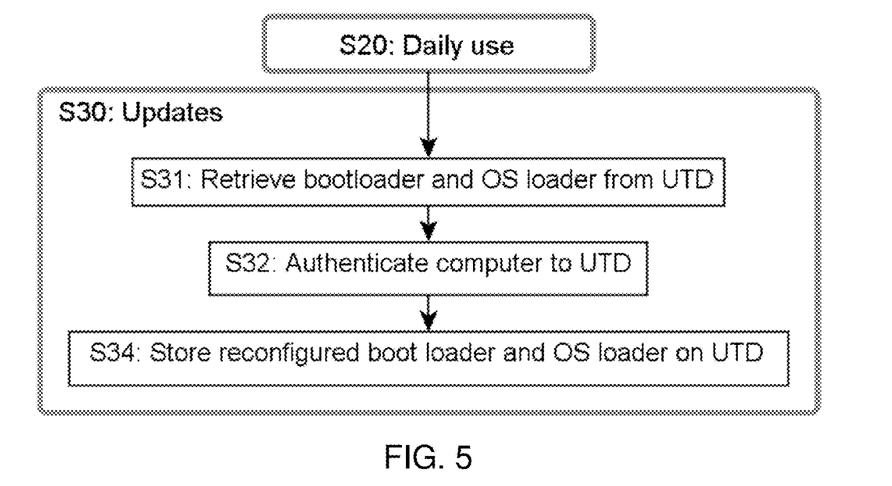

At present, another aspect of the present invention is discussed, which concerns (legitimate) updates to the OS loader and/or the boot loader, in reference to FIG. 5.

Basically, updates can be performed by authenticating S32 to the UTD, to allow a reconfigured version of the boot loader 16*a* and/or the OS loader 24*a* to be stored S34 on the UTD. To that aim, one may need to modify, during the set-up phase, installation files of the OS services that are necessary for generating and/or reconfiguring the boot loader and/or the OS loader. These installation files are stored on the HDD. Updates to the crypto drivers may be carried out in a similar way. This scheme ensures that, whenever the OS is updated on the target computer and updates need be applied to any of the boot loader, the OS loader and crypto-drivers, then these updates can be applied to the boot loader, the OS loader and crypto-drivers as stored on the UTD.

With Windows systems for instance, because the OS loader is aware that the OS was loaded from a different device, so is the Windows operating system and hence whenever the Windows Operating system needs to update any components of the OS loader, it can do so.

Concerning the modification of the installation files of the OS services with Linux systems: in order for the OS to install a new OS loader, one needs to update the tool chain with which the so called initrd file is generated. This initrd file may have been modified to access the keys from the UTD, as discussed earlier (under section 1 above). Now, one needs to make sure that these modifications are preserved when a new OS loader is generated. In Linux, this is accomplished by updating the initramfs-tools Ubuntu Linux or dracut-tools Red Hat Linux, for instance, by updating the cryptroot script that obtains the password for decrypting the HDD.

Modifying the installation files will not always be necessary. For instance, in Windows, modifying the installation files is not necessary if the full disk encryption/decryption is implemented via a disk encryption/decryption driver, i.e., a filter driver that sits between the real disk drive and the OS's file system driver. This information is part of the BCD configuration and would not be overwritten by any other change.

If after completing the booting process a new update needs to be stored on the UTD, the computer may authenticate to the UTD, create an updated boot loader and/or updated OS loader and store these on the UTD. The boot loader and OS loader may be reconfigured as discussed earlier, i.e., to retrieve the encryption keys possibly from the UTD, and allow the OS loader to complete booting from the HDD by reconfiguring boot parameters.

In variants, the boot loader and OS loader may, during an update operation, be modified on the UTD itself or partly on the computer and partly on the UTD, and thereby be reconfigured, notably to be able to retrieve encryption keys (e.g., from the UTD) and allow the OS loader to complete booting from the HDD, by reconfiguring boot parameters.

At present, another class of embodiments is discussed, which concerns the possibility to provide a honeypot boot loader and/or a honeypot OS loader, in reference to FIG. 8. Essentially, this amounts to replacing S15*a* the boot loader and/or the OS loader detected at step S11 with honeypot counterparts, on the HDD. A copy of these honeypot counterparts is stored S15*b* on the UTD. For example, a honeypot OS loader would appear to the user as a login screen similar to that presented by the genuine OS loader of the UTD when asking the user for a passphrase. Still, the honeypot version would be non-functional, e.g., password verification always fails, independently of the passphrase given.

Thus, for a malicious user who is not aware of the detailed set-up of the computer, the computer looks like an ordinary computer that requires a passphrase. Then, if a malicious user tries to modify the honeypot boot loader, it is possible to identify that the latter has been tampered with and alert the legitimate user about an attempted break-in.

The honeypot boot loader/OS loader shall preferably be almost identical to a valid boot loader and OS loader, except that password verification always fails, e.g., by storing incorrect data in the password verification entries, such that a malicious user cannot identify this honeypot boot loader as such.

Meanwhile, the true boot loader 16a as stored on the UTD may be provided with additional functionality, e.g., to cause to compare the genuine honeypot components as stored on the UTD to their counterparts stored on the HDD. Namely, the boot loader 16a may further be designed such that, upon connection of the user trusted device to the computer, the boot loader 16a is detected by the firmware 122 and subsequently execute at least partly at the computer to additionally cause to compare S24 the honeypot components as stored S15a on the computer with the honeypot components as stored on the UTD. If S241 the compared versions do not differ, then the transferred OS loader 24b can be executed normally S27, i.e., as described earlier.

Now, if the compared versions differ, a user or any relevant component of the system (or in connection therewith) could be notified S242 accordingly. In fact, many possible actions may be contemplated, after the notification S242. For example, the OS loader as stored on the UTD may nevertheless be loaded in main memory for execution. Still, user input could be requested, in view of copying the modified honeypot boot loader and OS loader for further investigation. Also, if the compared versions differ, one may want to store contents of the honeypot components on the HDD again, for them to appear genuine the next time somebody attempts to tamper with the computer.

Referring now back to FIG. 2: according to another aspect, the invention can also be embodied as a UTD such as described above. Basically, the UTD 20 is designed for allowing a computer 10 to boot therefrom. The UTD is connectable to the computer and comprises a boot loader 16a and an OS loader 24a such as discussed above. The UTD is furthermore designed to prevent any unauthenticated user to modify any of this boot loader and OS loader.

Possible embodiments of the user trusted device 20 are now discussed in detail.

Various types of trusted devices can be contemplated for implementing present methods. First, the user trusted device 20 should be reasonably "mobile" to allow for an easy and practical connection with the computer 10, i.e., this is preferably a handheld device. It is typically a corporate or personal secure device, that is, a device that a company or a user owns and controls, such as a USB device, preferably a USB flash drive (a data storage device that includes flash memory, in addition to an integrated Universal Serial Bus (USB) interface), a mobile phone or a personal digital assistant (PDA) that only this user uses or that is owned and controlled by the company this user works for. Typically, this device weighs less than 200 g. However, owing to the rather limited requirements in terms of user interfaces, memory and processing capability of the device 20, this device shall preferably weighs less than 60 g and more preferably less than 40 g.

The user trusted device 20 may be provided with processing means (and/or computing means, i.e., CPU) 211, such as a crypto processor, coupled to a memory, which generally comprises a persistent memory 214 and, possibly, a non-persistent memory too (not explicitly shown but the non-persistent memory can be considered to be part of the processing means 211). Yet, a non-persistent memory and a processor are not mandatory for implementing the essential steps described in the previous section. Although, a processor is not strictly necessary, implementing the authentication mechanism and maintaining the state parameter (as to whether the device is modifiable or not) is easier to implement by use of a processor or micro-controller. The non-persistent memory and a processor may, however, be needed in cases of concurrent execution of the boot loader and the OS loader at the PC and the UTD, or if additional functionality is sought, such as additional verifications involving the BIOS. In the present context, the persistent memory 214 notably stores computerized methods 217, interacting with other components stored on the device 20 (which components may be executable modules or code 16a, 24a, data 220, or keys 213) or still other peripheral components 218, as necessary for operating the device 20. In particular, said computerized methods 217 may interact with the processing means 211 to trigger the transfer and execution of the boot loader 16, the latter meant to be executed by processing means 105, 211 of the computer 10 and/or the device 20. The boot loader 16 and the OS loader 24a can, each, be regarded as a single module provided with different functions, and able to execute at the device and/or the computer, or as complex modules having different functions. They may also be regarded as forming parts of the computerized methods 217.

Preferably, the boot loader and OS loader that reside on the user trusted device shall occupy as little memory as possible. For instance, some implementations have been successfully tested which use less than 128 mo (for Windows) or 32 mo (for Linux) for the boot loader and OS loader, the size mostly determined by the size of the OS loader which is OS dependent. Additionally, the user trusted device should provide enough storage capability for storing data 220, which may typically take up to 64 ko, for instance, if the trustworthiness of the BIOS is to be attested by these modules. This excludes storage necessary to store components of the OS 112 or UTD's components designed to retrieve such OS components from the network.

The connection interface 212 to the PC 10 may for instance be of the following type:
Universal Serial Bus or USB;
External Small Computer System Interface or SCSI;
External Serial Advanced Technology Attachment or SATA;
Firewire; or
Thunderbolt.

More generally though, this could be any current or future connector (wired or wireless) that allows the computer 10 to boot from the external device 20. In addition, the same interface 212 can furthermore allow the user trusted device 20 for communicating with any external device such as a video projector, a printer, or any other output device.

If necessary, the secure device 20 has a card reader to read user credentials stored on a memory card (e.g., non-secure memory) or any smart card. Suitable use can safely be made out of such data, e.g., user credentials as stored on the card. In particular, a trustworthy connection can be established between a user (or strictly speaking the device 20) and a third party, e.g., server 30, via the host 10 and using such data. In a variant, the user credentials may be stored directly on the secure device. Further usual interfaces (like control buttons and display) may be provided to allow for interaction with the user. Most notably, such trustworthy display on the secure device 20 can be used to obtain user assertions about the environment s/he presently is in. This way, for example, but without limitation, a user can confirm requests by the server 30 to ascertain that s/he is not in a public space such as an Internet café, when starting the computer 10.

Similarly, and as illustrated in FIG. 1: the invention can also be embodied as a computerized system 100, comprising a UTD 20 and a computer 10, to which the UTD is connectable, just as discussed earlier. FIG. 1 represents a general computerized system 100, suited for implementing method steps as involved in embodiments of the invention.

It will be appreciated that the methods described herein are largely non-interactive, and automated by way of computerized systems, such as servers or embedded systems. In exemplary embodiments, the methods described herein can be implemented in a (partly) interactive or non-interactive system. These methods can further be implemented at least partly in software, firmware, hardware, or combinations thereof. In exemplary embodiments, the methods described herein are implemented at least partly as executable programs (e.g., being part of a boot loader) and is executed at least in part by a special or general-purpose digital computer 10, such as a personal computer, workstation, minicomputer, or mainframe computer. The most general system 100 therefore includes general-purpose computer, e.g., a PC 10.

In exemplary embodiments, in terms of hardware architecture, as shown in FIG. 1, the computer 10 includes a processor 105, memory 110 coupled to a memory controller 115, and one or more input and/or output (I/O) devices (or peripherals) 20, 145 that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 20, 145 may generally include any generalized cryptographic card or smart card known in the art. One or more of these devices may be user trusted devices 20, as discussed above.

The processor 105 is a hardware device for executing software, particularly, software that is stored in memory 110. The processor 105 can be any custom made or commercially available processor, a central processing unit (CPU), an auxiliary processor among several processors associated with the computer 10, a semiconductor based microprocessor (in the form of a microchip or chip set), a macroprocessor, or generally any device for executing software instructions.

The memory 110 typically includes volatile memory elements (e.g., random access memory (RAM, such as DRAM, SRAM, SDRAM, etc.) and possibly nonvolatile (persistent) memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate or link to electronic, magnetic, optical, and/or other types of storage media. Note that the memory 110 can have a distributed architecture, where various components are situated remote from one another, but can be accessed by the processor 105. Memory portions can be allocated to specific purposes, e.g., to be mounted as a RAM disk, to receive components of the boot loader and/or the OS loader such as executable modules (including processor instruction modules), for subsequent execution at the computer 10.

In operation, software/program code involved in embodiments of this invention, for instance software/program code to be transferred to memory 110, may include one or more separate programs, each of which comprises a listing of executable instructions for implementing logical functions. In the example of FIG. 1, memory 110 may be loaded with instructions for enabling the computer 10 to start and complete booting from the user trusted device 20.

Components to be loaded in memory 110 may comprise various application components and operating system image components, and preferably hardware component drivers too. The memory 110 may thus be set in condition to execute a suitable OS 112. The novel methods discussed here nevertheless operate at least partly "before" any OS component be fully loaded at the host 10. At least some of these steps operate at another level, closer to hardware, whereby the normal behavior of the computer 10 is impacted. Upon (and if) executing, the OS 112 shall essentially control the execution of application programs, and provide scheduling, input-output control, file and data management, memory management, and communication control and related services.

At least part of the methods described herein may be in the form of a source program, executable program (object code), script, or any other entity comprising a set of instructions to be performed. When a source program, then the program needs to be translated via a compiler, assembler, interpreter, or the like, which may or may not be included within the memory(ies) of the device 20 and/or the host 10. Furthermore, the methods can be written as an object oriented programming language, which has classes of data and methods, or a procedure programming language, which has routines, subroutines, and/or functions. In all cases, the novel methods discussed herein are designed so as to operate properly in connection with the firmware, where needed, and with the device's CPU 11, as needed.

In exemplary embodiments, a conventional keyboard 150 and mouse 155 can be coupled to the input/output controller 135. Other I/O devices 145 may include, for example a printer, a scanner, microphone, and the like. Finally, the I/O devices 20, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. As otherwise evoked in the previous section, the I/O devices 20, 145 may comprise any generalized cryptographic card or smart card known in the art. The system 100 can further include a display controller 125 coupled to a display 130. In exemplary embodiments, the system 100 can further include a network interface 124 for coupling to a network 165. The network 165 can be an IP-based network for communication between the computer 10 and any external server, client and the like via a broadband connection. The network 165 transmits and receives data between the computer 10 and external systems, e.g., a server 30. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 10 is a PC, workstation, intelligent device or the like, the software in the memory 110 may further include a basic input output system (BIOS) or any similar initialization software. The BIOS is a set of essential software routines that initialize and test hardware at startup. It is otherwise generally able to start an OS, and support the transfer of data among the hardware devices. The BIOS is typically stored in ROM so that the BIOS can be executed when the computer 10 is activated.

For the purpose of implementing methods as described herein, the BIOS can be used (interacted with) notably to initiate the boot process and complete it, as well as, possibly, to initiate a communication over a network. More generally though, any suitable firmware or interface to a firmware (i.e., a combination of persistent memory and program code and data stored therein, which operates "below" the OS 112 in the software stack), can be used to that aim. This typically is the BIOS. However, examples of suitable firmwares or interface thereto include the so-called Extensible Firmware Interface (EFI) BIOS or, still, the Unified Extensible Firmware Interface (UEFI). The latter is a specification that defines a software interface between the operating system and the platform firmware. UEFI is meant to replace the BIOS firmware interface, present in all IBM PC-compatible computers today. In practice, UEFI provides the same and even more functionality than a traditional PC BIOS and can be used as well. More generally, any initialization firmware operating below the operating system in the software stack may potentially convene for the purpose of implementing the present invention.

When the computer 10 is in operation, the processor 105 is configured to execute software stored within the memory 110, to communicate data to and from the memory 110, and to generally control operations of the computer 10 pursuant to the software. The methods described herein, in whole or in part, but typically the latter, are read by the processor 105, possibly buffered within the processor 105, and then executed.

The portions of the methods described herein that can be implemented in software can be stored on any computer readable medium for use by or in connection with any computer related system or method.

Finally, the invention can also be embodied as a computer program product for allowing a computer to boot from a UTD, the computer program product comprising a computer-readable storage medium having computer-readable program code embodied therewith, preferably consisting of several modules, the computer-readable program code configured to implement steps of method described herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. Finally, many other variants than explicitly touched above can be contemplated. For instance, a component that is herein described as being executable code may in fact comprise both executable code and non-executable data such as strings to be displayed to the user.

The invention claimed is:

1. A method for allowing a computer to boot from a user trusted device, wherein:
   the computer comprises a long-term data storage device storing operating system (OS) services; and
   the user trusted device is separate from the computer and stores:
   a boot loader, detectable and executable by a firmware of the computer, upon detecting a connection of the user trusted device to said computer;
   an OS loader designed to load an OS, of the computer; and
   one or more crypto drivers designed for allowing access to the OS and data stored encrypted on said long-term data storage device of the computer;
   wherein the user trusted device is designed to prevent unauthenticated access of each of: the boot loader; the one or more crypto drivers; and the OS loader, as stored thereon, the method comprising:
   upon connection of the user trusted device to the computer, letting the boot loader be detected by said firmware for a subsequent execution of the boot loader at least partly at the computer to cause to transfer the OS loader of the user trusted device from the user trusted device to the computer, by loading the OS loader into a main memory of the computer, without storing any part of the loaded OS loader on the long-term data storage device of the computer; and
   executing the transferred OS loader at least partly at said computer, to cause to execute the one or more crypto drivers of the user trusted device for access to said OS and said data stored encrypted on said long-term data storage device by providing at least one cryptographic key from the user trusted device to the one or more crypto drivers during the execution of the one or more crypto drivers, to start said OS services and complete booting of the computer.

2. The method of claim 1, wherein said boot loader and/or said OS loader are designed to cause, upon subsequent execution at least partly at said computer, reconfiguration of boot configuration parameters of the transferred OS loader, such as a Boot Configuration Data store, to allow the OS services to be started from the long-term data storage device.

3. The method of claim 1, further comprising: wherein the at least one cryptographic key comprises an encryption key (EK) and/or a decryption key (DK).

4. The method of claim 1, further comprising, prior to said connection of the user trusted device to the computer:
   analyzing said long-term data storage device to detect one or more of the following entities: a boot loader; an OS loader; and one or more crypto drivers, each residing unencrypted on the long-term data storage device of the computer; and
   after authentication to the user trusted device, storing versions of the detected entities on the user trusted device, respectively as said boot loader and/or said OS loader and/or said one or more crypto drivers, wherein the stored versions of the boot loader and/or the OS loader are reconfigured to cause, upon the subsequent execution of the boot loader and/or the OS loader, reconfiguration of boot configuration parameters of the OS loader, to allows the OS services to be started from the long-term data storage device of the computer,
   and wherein, preferably, the method further comprises removing or disabling the boot loader and/or OS loader detected on the data storage device.

5. The method of claim 4, wherein the long-term data storage device analyzed is unencrypted, the method further comprising, prior to said connection of the user trusted device to the computer, storing one or more crypto drivers for said OS on the user trusted device, in addition to or as part of storing a reconfigured version of the detected OS loader, and this, preferably by adding said one or more crypto drivers to the detected OS loader, such that the version of the OS loader stored on the user trusted device includes said one or more crypto drivers.

6. The method of claim 5, further comprising, prior to said connection of the user trusted device to the computer:
generating at least one key for encrypting (EK) and decrypting (DK) the long-term data storage device, and storing the generated at least one key on the user trusted device,
configuring the one or more crypto drivers and the OS loader for them to cause to retrieve said at least one generated key from the user trusted device, prior to or during execution of the one or more crypto drivers caused by said subsequent execution of the transferred OS loader; and
encrypting the data storage device with one of the at least one generated key.

7. The method of claim 4, wherein the long-term data storage device that is analyzed is encrypted, wherein the method further comprising, prior to said connection of the user trusted device to the computer:
retrieving, from the computer, at least one key for encrypting and decrypting the data storage device; and storing the retrieved at least one key on the user trusted device or an entity accessible by the user trusted device, such as smart card, and removing the retrieved at least one key from the computer,
and wherein storing versions of said detected entities comprises storing versions of the one or more crypto drivers and the OS loader, which have been reconfigured to cause to retrieve said key from the user trusted device, prior to or during execution of the one or more crypto drivers caused by said subsequent execution of the transferred OS loader.

8. The method of claim 1, the method further comprising, prior to said connection of the user trusted device to the computer and while installing the OS on the computer: configuring the one or more crypto drivers and the OS loader, such that the configured one or more crypto drivers and the OS loader can be stored on the user trusted device and, preferably, are able to cause the retrieving of said key from the user trusted device, upon said subsequent execution of the OS loader transferred to the computer.

9. The method of claim 1, further comprising, after completing the booting of the computer: authenticating to the user trusted device to allow a reconfigured version of the boot loader and/or the OS loader to be stored on the user trusted device.

10. The method of claim 4, further comprising: replacing the detected boot loader and/or the detected OS loader on the long-term data storage device with a honeypot boot loader and/or a honeypot OS loader; and storing a copy of each of said honeypot boot loader and said honeypot OS loader on the user trusted device.

11. The method of claim 10, wherein the boot loader is further designed such that, upon connection of the user trusted device to the computer, the boot loader is detected by said firmware and subsequently executes at least partly at the computer to further cause the computer to:
compare the honeypot boot loader and/or the honeypot OS loader, as stored on the computer in replacement of the detected boot loader and/or the detected OS loader; respectively, with the honeypot boot loader and/or the honeypot OS loader; respectively, as stored on the user trusted device; and
if the compared versions do not differ, execute the transferred OS loader at least partly from said computer.

12. The method of claim 11, further comprising: if the compared versions differ, notifying that the compared versions differ.

13. The method of claim 1, wherein said data stored encrypted on said data storage device comprises a kernel of said OS.

* * * * *